United States Patent
Marshburn

(10) Patent No.: US 6,607,201 B2
(45) Date of Patent: Aug. 19, 2003

(54) SWIVEL WHEEL ASSEMBLY WITH ADJUSTABLE SHOCK ABSORPTION

(76) Inventor: Bill W. Marshburn, 3976 Firethorn La., Rock Hill, SC (US) 29732

( * ) Notice: Subject to any disclaimer, the term of this patent is extended or adjusted under 35 U.S.C. 154(b) by 0 days.

(21) Appl. No.: 10/037,920

(22) Filed: Jan. 2, 2002

(65) Prior Publication Data

US 2002/0084608 A1 Jul. 4, 2002

Related U.S. Application Data

(60) Provisional application No. 60/259,455, filed on Jan. 3, 2001.

(51) Int. Cl.[7] .............................................. B60B 33/00
(52) U.S. Cl. ............... 280/79; 280/47.22; 280/124.179; 16/44
(58) Field of Search .................. 280/78, 79, 47.41, 280/87.01, 285, 286, 788, 47.22, 124.164, 124.179; 16/18 R, 44; 267/2, 248

(56) References Cited

U.S. PATENT DOCUMENTS

| | | | | |
|---|---|---|---|---|
| 2,227,875 A | * | 1/1941 | Boden ............................ | 16/44 |
| 2,468,627 A | * | 4/1949 | Hamilton ....................... | 16/44 |
| 2,568,261 A | * | 9/1951 | Stade ............................. | 16/44 |
| 2,707,795 A | * | 5/1955 | Skupas ........................... | 16/44 |
| 3,270,367 A | * | 9/1966 | Loos ............................... | 16/44 |
| 4,372,569 A | | 2/1983 | Otterson | |
| 4,645,230 A | * | 2/1987 | Hammons ...................... | 280/78 |
| 4,763,910 A | * | 8/1988 | Brändli et al. .................. | 16/44 |
| 4,779,889 A | | 10/1988 | Morrison | |
| 5,221,100 A | | 6/1993 | McNutt | |
| 5,368,325 A | * | 11/1994 | Hazen ........................... | 280/78 |
| 5,400,469 A | * | 3/1995 | Simonsen ....................... | 16/44 |
| 5,769,449 A | | 6/1998 | Keesee | |

FOREIGN PATENT DOCUMENTS

| | | | | |
|---|---|---|---|---|
| FR | 411787 | * | 4/1910 | ................... 280/78 |

* cited by examiner

Primary Examiner—Frank Bennett Vanaman
(74) Attorney, Agent, or Firm—Schwartz Law Firm, P.C.

(57) ABSTRACT

A swivel wheel assembly includes a wheel axle, and a vehicle wheel rotatably mounted on the wheel axle. A shock-absorbing wheel fork is secured to opposite ends of the wheel axle and includes first and second elongated spaced-apart support arms. A pivot pin extends through pin openings formed with proximal ends of the first and second support arms. A base is carried by the pivot pin, and is adapted for pivoting movement about an axis defined by the pivot pin. An adjustable shock absorber dampens pivoting movement of the base relative to the vehicle wheel, thereby absorbing the energy of sudden shocks to the vehicle wheel during use.

7 Claims, 3 Drawing Sheets

SWIVEL WHEEL ASSEMBLY WITH ADJUSTABLE SHOCK ABSORPTION

TECHNICAL FIELD AND BACKGROUND OF INVENTION

This patent application claims priority to U.S. Provisional Patent Application Serial No. 60/259,455, filed on Jan. 3, 2001. This application relates to a swivel wheel assembly with adjustable shock absorption. The invention is especially applicable for use on utility vehicles, such as trailers, adapted for being hauled. The invention is easy to maneuver, and includes an adjustable shock absorber which allows custom stabilization of the vehicle for a smoother ride when towed. In a preferred embodiment, the utility vehicle has a conventional bumper pull and two identical laterally-spaced swivel wheel assemblies.

Swivel wheel assemblies for utility vehicles are well known in the prior art. According to one such assembly described in U.S. Pat. No. 4,372,569, a vehicle wheel is rotatably mounted on a wheel axle beneath a shock absorber. A pair of wheel support arms are connected at one end to the wheel axis and at the opposite end to a pivot pin located between two compression springs of the shock absorber. The shock absorber is connected to a swivel plate which allows swivel movement of the wheel assembly about a vertical axis. In this assembly, the degree of shock or energy absorption is dictated by a predetermined biasing force created by the compression springs. Because the spring compression is not adjustable, the resulting energy absorption cannot be custom set based on the particular load being carried on the vehicle.

The present invention overcomes this and other problems of prior art swivel wheel assemblies by incorporating a shock absorber which is highly efficient and conveniently adjusted to accommodate the exact load being hauled. Custom adjustment of the shock absorber provides a smoother ride and better handling of the vehicle when towed. In addition, the invention is relatively easy to assemble and disassemble.

SUMMARY OF INVENTION

Therefore, it is an object of the invention to provide swivel wheel assembly for use on a utility trailer to facilitate maneuverability of the trailer.

It is another object of the invention to provide swivel wheel assembly incorporating a shock absorber which is readily adjustable to accommodate the particular load being hauled.

It is another object of the invention to provide swivel wheel assembly incorporating a shock absorber which is highly efficient to provide a smooth ride and enhance vehicle handling.

It is another object of the invention to provide swivel wheel assembly incorporating a shock absorber which creates a biasing force acting directly on the pivot member of the wheel assembly.

It is another object of the invention to provide swivel wheel assembly which incorporates multiple shock-absorbing components.

It is another object of the invention to provide swivel wheel which can be quickly assembled and disassembled.

These and other objects of the present invention are achieved in the preferred embodiments disclosed below by providing a swivel wheel assembly. The wheel assembly includes a wheel axle. A vehicle wheel is rotatably mounted on the wheel axle. A shock-absorbing wheel fork is secured to opposite ends of the wheel axle. The wheel fork includes first and second elongated spaced-apart support arms located on opposite sides of the vehicle wheel. The support arms have respective distal and proximal ends. The distal ends define respective axle openings receiving the wheel axle. The proximal ends extend beyond a periphery of the vehicle wheel and define respective pin openings. A pivot pin extends through the pin openings formed with proximal ends of the first and second support arms. A base is carried by the pivot pin, and is adapted for pivoting movement about an axis defined by the pivot pin. A vertical swivel shaft is mounted on the base, and is adapted for connecting to an underframe of a vehicle to provide swivel movement of the vehicle wheel about an axis defined by the swivel shaft. A shock absorber is connected to the base for dampening pivoting movement of the base relative to the vehicle wheel, thereby absorbing the energy of sudden shocks to the vehicle wheel during use. Means are provided for adjusting the shock absorber to a selected degree of energy absorption.

According to another preferred embodiment of the invention, the base includes an upper pivoting shock plate having a center web and opposing upwardly turned flanges.

According to another preferred embodiment of the invention, a lower fixed shock plate is located below the upper pivoting shock plate. The lower fixed shock plate is attached to the first and second support arms.

According to another preferred embodiment of the invention, the lower fixed shock plate includes a center web and opposing downwardly turned flanges.

According to another preferred embodiment of the invention, the shock absorber includes a rubber disc located between the upper and lower shock plates.

According to another preferred embodiment of the invention, an elongated retainer bolt extends through respective aligned openings in the upper and lower shock plates and the rubber disc.

According to another preferred embodiment of the invention, the shock absorber further includes a compression spring coiled around the retainer bolt. The spring bears against an underside of the lower fixed shock plate and cooperates with the retainer bolt to urge the upper pivoting shock plate into contact with the rubber disc against a biasing force of the spring.

According to another preferred embodiment of the invention, opposing upper and lower spring caps are located at opposite ends of the compression spring, and have respective aligned openings for receiving the retainer bolt.

According to another preferred embodiment of the invention, the retainer bolt has an external screw thread which receives a complementary-threaded fastener. The fastener cooperates with the spring caps to adjust the compression of the spring and the resulting biasing force acting against the upper pivoting shock plate.

According to another preferred embodiment of the invention, an alignment sleeve is carried on the retainer bolt and extends through the opening formed in the lower spring cap to align the lower spring cap relative to the compression spring.

According to another preferred embodiment of the invention, the wheel axle is an axle bolt having an enlarged head and an external screw thread.

According to another preferred embodiment of the invention, an internally-threaded fastener is applied to the threaded end of the axle bolt to retain the axle bolt in position through the axle openings of the support arms.

According to another preferred embodiment of the invention, the fastener is a castellated nut with slots adapted for receiving a safety pin extending through the axle bolt to further retain the axle bolt in position through the axle openings of the support arms.

According to another preferred embodiment of the invention, the pivot pin is a pivot bolt having an enlarged head and an external screw thread.

According to another preferred embodiment of the invention, an internally-threaded fastener retains the pivot bolt in position through the pin openings of the support arms.

According to another preferred embodiment of the invention, the fastener is a castellated nut with slots adapted for receiving a safety pin extending through the pivot bolt to further retain the pivot bolt in position through the pin openings of the support arms.

In another embodiment, the invention is a shock-absorbing wheel fork for being secured to a wheel axle of a vehicle wheel. The wheel fork includes first and second elongated spaced-apart support arms for being located on opposite sides of the vehicle wheel and having respective distal and proximal ends. The distal ends define respective axle openings for receiving the wheel axle. The proximal ends are adapted for extending beyond a periphery of the vehicle wheel. The proximal ends define respective pin openings. A pivot pin extends through the pin openings formed with proximal ends of the first and second support arms. A base is carried by the pivot pin and is adapted for pivoting movement about an axis defined by the pivot pin. A vertical swivel shaft is mounted on the base, and is adapted for connecting to a frame of a vehicle to provide swivel movement of the vehicle wheel about an axis defined by the swivel shaft. A shock absorber is operatively connected to the base for dampening pivoting movement of the base relative to the vehicle wheel, thereby absorbing the energy of sudden shocks to the vehicle wheel during use. Means are provided for adjusting the shock absorber to a selected degree of energy absorption.

BRIEF DESCRIPTION OF THE DRAWINGS

Some of the objects of the invention have been set forth above. Other objects and advantages of the invention will appear as the description proceeds when taken in conjunction with the following drawings, in which.

DESCRIPTION OF THE PREFERRED EMBODIMENT AND BEST MODE

Figure 1:
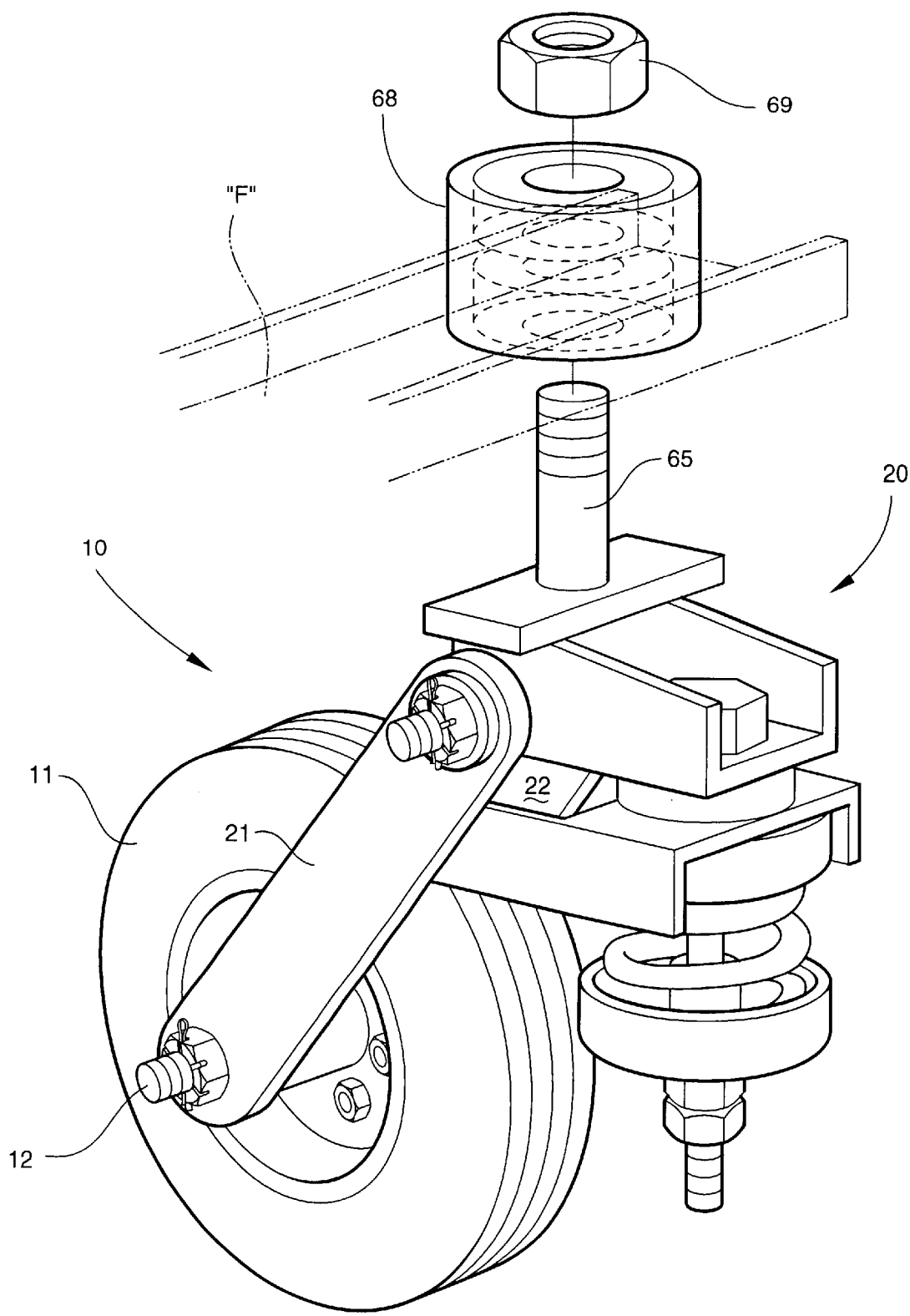
FIG. 1 is a perspective view of the swivel wheel assembly according to one preferred embodiment of the present invention.

Referring now specifically to the drawings, a swivel wheel assembly according to the present invention is illustrated in FIG. 1, and shown generally at reference numeral 10. The wheel assembly 10 is especially applicable for use on utility vehicles, such as trailers, designed for being hauled. The trailer may be a three-wheeled vehicle with a single swivel wheel assembly 10 in the front and two conventional wheels in the rear, or a two-wheeled vehicle with two identical swivel wheel assemblies 10 on either side.

Figure 2:
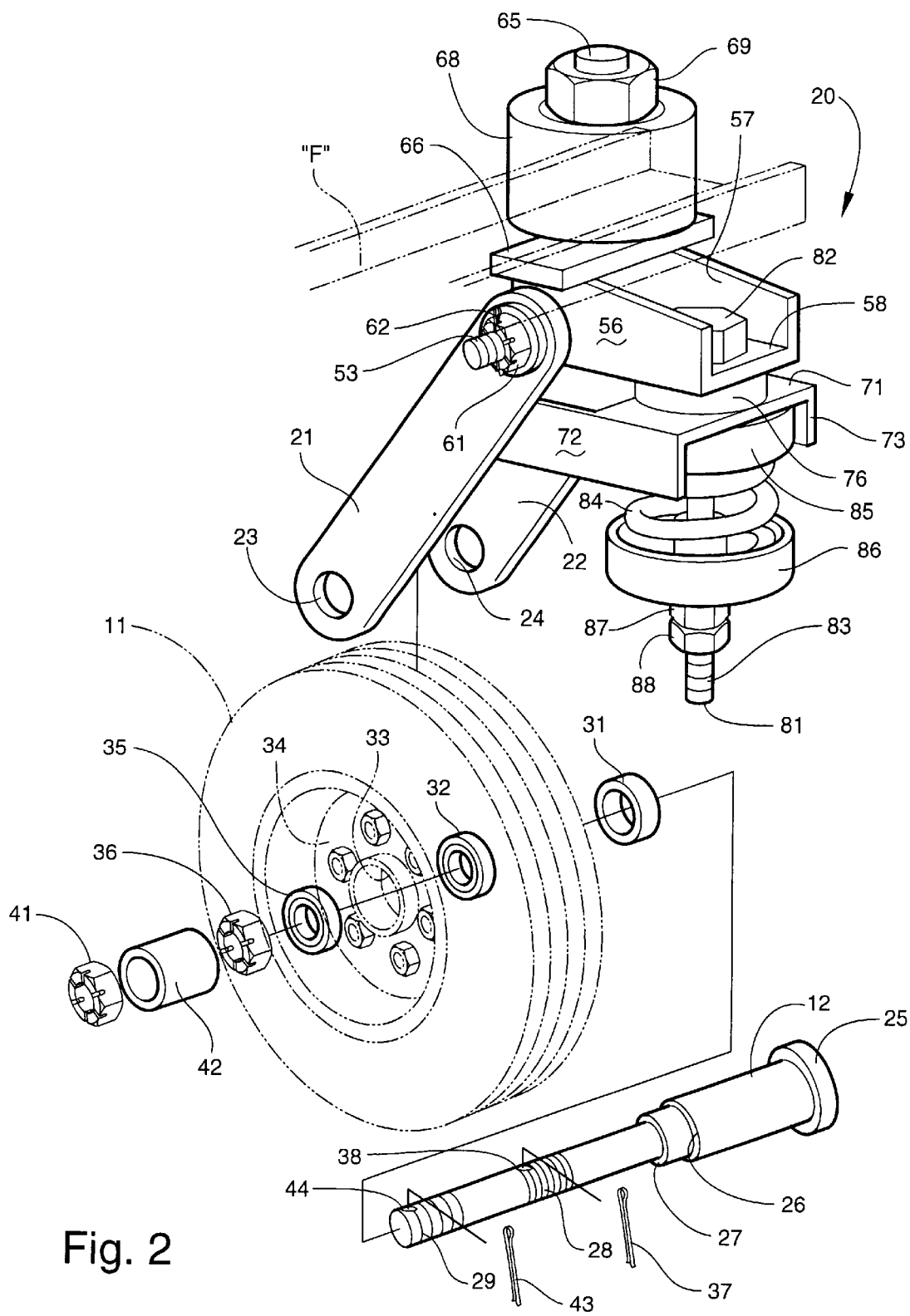
FIG. 2 is a perspective view of the swivel wheel assembly with the vehicle wheel removed, and showing parts of the assembly exploded for clarity.

The swivel wheel assembly 10 includes a vehicle wheel 11 mounted for rotation on a wheel axle 12, and a shock-absorbing wheel fork 20 secured to the wheel axle 2 and an underframe "F" of the utility vehicle. As best shown in FIG. 2, the wheel fork 20 is constructed of first and second elongated, spaced-apart support arms 21 and 22 having respective distal and proximal ends. The distal ends define respective axle openings 23 and 24 which receive the wheel axle 12. The wheel axle 12 has an enlarged head 25, a pair of axially-spaced annular shoulders 26 and 27, and two axially-spaced screw threads 28 and 29. A seal 31 fits against the first annular shoulder 26. A wheel bearing 32 fits against the second annular shoulder 27. The center hole 33 of the wheel hub 34 resides between the first wheel bearing 32 and a second wheel bearing 35. An internally-threaded, castellated nut 36 is applied to the inner screw thread 28 to hold the wheel 11 in position on the axle 12. A cotter pin 37 is passed through slots in the nut 36 and through a small hole 38 formed in the axle 12 to secure the nut 36 against outward movement. A second castellated nut 41 is applied to the outer screw thread 29, and cooperates with a spacer 42 to further retain the vehicle wheel 11 on the axle 12. Cotter pin 43 is passed through slots in the nut 41 and a second hole 44 formed in the axle 12 to secure the nut 41 against outward movement.

Figure 3:
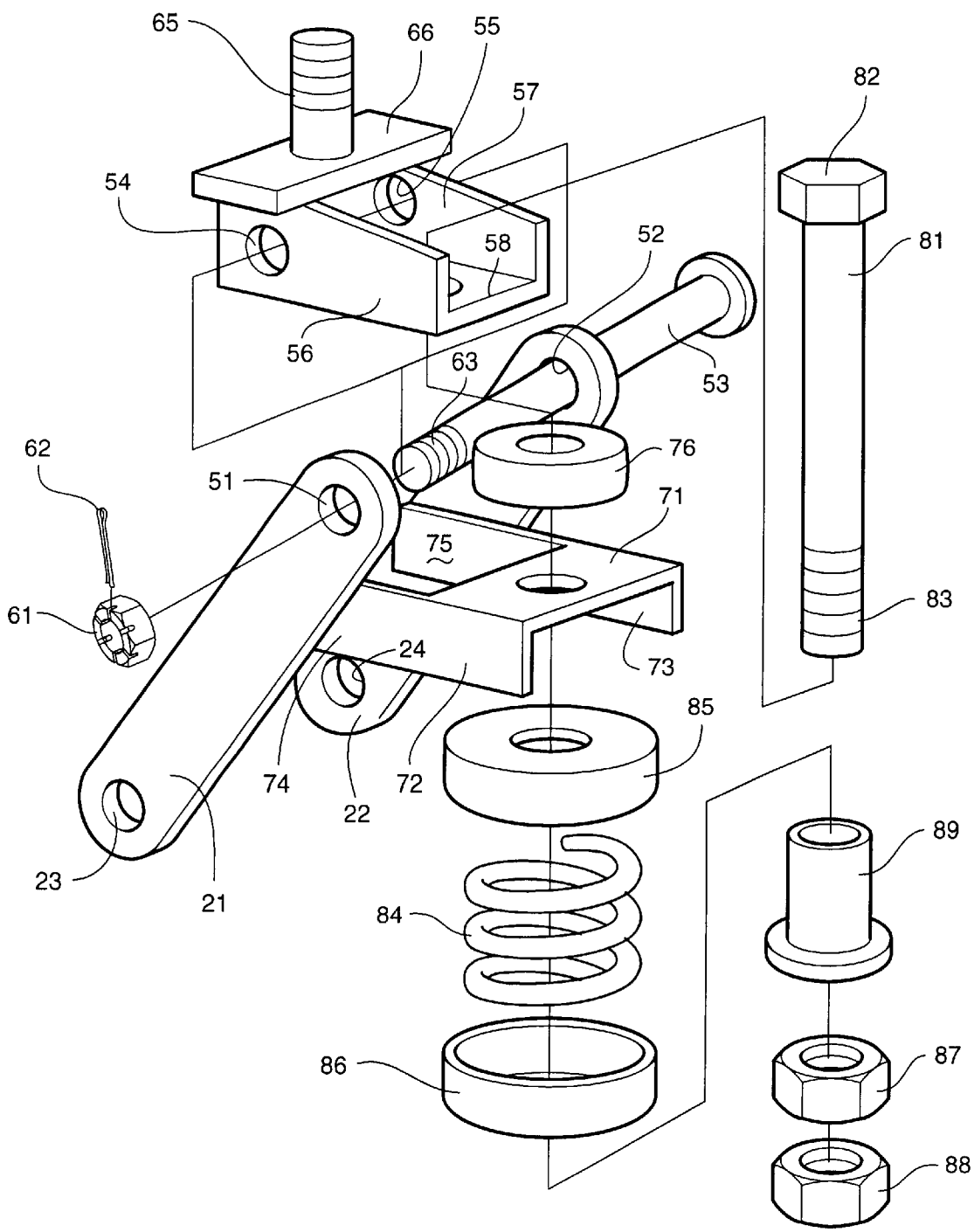
FIG. 3 a perspective view of the swivel wheel assembly with the vehicle wheel shown in phantom, and showing other parts of the assembly exploded for clarity.

Referring to FIGS. 2 and 3, the proximal ends of the wheel fork support arms 21 and 22 define respective pin openings 51 and 52 for receiving a threaded pivot pin 53. The pivot pin 53 extends through the pin openings 51, 52 and through openings 54 and 55 formed in spaced, upwardly turned flanges 56 and 57 of an upper pivoting shock plate 58. The shock plate 58 is designed for sudden impulse movement about a horizontal axis defined by the pivot pin 53. The pivot pin 53 is retained by a castellated nut 61 and cotter pin 62. The cotter pin 62 passes through slots formed in the nut 61, and through a small hole 63 formed in the pivot pin 53. A vertical swivel shaft 65 is attached to a mounting plate 66 welded to the spaced flanges 56 and 57 of the shock plate 58 to allow swivel movement of the vehicle wheel 11 about a vertical axis defined by the swivel shaft 65. Preferably, the swivel shaft 65 has a threaded end which receives a bearing 68 and nut 69, as shown in FIGS. 1 and 2, for securing the swivel wheel assembly 10 to the vehicle underframe "F".

A lower, fixed shock plate 71 is located below the upper shock plate 58, and includes downwardly turned flanges 72 and 73 with respective extensions 74 and 75 permanently welded to the support arms 21 and 22. A rubber shock-absorbing disc 76 is located between the center webs of the upper and lower shock plates 58 and 71. The disc 76 provides a cushioned barrier between the upper pivoting shock plate 58 and the lower fixed shock plate 71. A retainer bolt 81 passes through aligned openings formed in the upper shock plate 58, rubber disc 76, and lower shock plate 71. The retainer bolt 81 has an enlarged head 82 which engages the upper shock plate 58, and a threaded end 83 for carrying a compression spring 84 sandwiched between opposing spring caps 85 and 86. The compression spring 84 is coiled around the retainer bolt 81 and cooperates with a pair of internally-threaded nuts 87, 88 and an alignment sleeve 89 to bear against the lower shock plate 71 between the flanges 72 and 73. The compression spring 84 creates a biasing force pulling on the retainer bolt 81 to urge the upper shock plate 58 downwardly against the rubber disc 76. Thus, as the vehicle wheel 11 encounters a sudden impact, the upper shock plate 58 pivots against the biasing force of the spring 84 to absorb the energy of the impact and create a smoother ride for the vehicle. The nuts 87 and 88 can be conveniently tightened or loosened, as desired, to control compression of the spring 84 and the resulting degree of force acting on the upper shock plate 58. The alignment sleeve 89 serves to properly align and center the lower spring cap 86.

A swivel wheel assembly is described above. Various details of the invention may be changed without departing from its scope. Furthermore, the foregoing description of preferred embodiment of the invention and best mode for practicing the invention are the provided for the purpose of illustration only and not for the purpose of limitation-the invention being defined by the claims.

I claim:

1. A swivel wheel assembly, comprising:

(a) a wheel axle;

(b) a vehicle wheel rotatably mounted on said wheel axle;

(c) a shock-absorbing wheel fork secured to said wheel axle, and comprising:

first and second elongated spaced-apart support arms located on opposite sides of said vehicle wheel and having respective distal and proximal ends, said distal ends defining respective axle openings receiving said wheel axle, and said proximal ends extending beyond a periphery of said vehicle wheel and defining respective pin openings;

a pivot pin extending through said pin openings formed with proximal ends of said first and second support arms;

a base carried by said pivot pin and adapted for pivoting movement about an axis defined by said pivot pin, said base comprising an upper pivoting shock plate having a center web and opposing upwardly turned flanges, and a lower fixed shock plate located below said upper shock plate and attached to said first and second support arms, said lower fixed shock plate comprising a center web and opposing downwardly turned flanges;

a vertical swivel shaft mounted on said base and adapted for connecting to an underframe of a vehicle to provide swivel movement of said vehicle wheel about an axis defined by said swivel shaft;

a shock absorber operatively connected to said base and comprising a rubber disc located between said upper and lower shock plates for dampening pivoting movement of said base relative to said vehicle wheel, thereby absorbing the energy of sudden shocks to said vehicle wheel during use;

an elongated retainer bolt extending through respective aligned openings in said upper and lower shock plates and said rubber disc;

a compression spring coiled around said retainer bolt and bearing against an underside of said lower fixed shock plate, said compression spring cooperating with said retainer bolt to urge said upper pivoting shock plate into contact with said rubber disc against a biasing force of said spring;

opposing upper and lower spring caps located at opposite ends of said compression spring, and having respective aligned openings for receiving said retainer bolt therethrough, said retainer bolt comprising an external screw thread receiving a complementary-threaded fastener, said fastener cooperating with said spring caps to adjust the compression of said spring and the biasing force acting against said upper pivoting shock plate; and an alignment sleeve carried on said retainer bolt and extending through the opening formed in said lower spring cap to align and center said lower spring cap relative to said compression spring, said alignment sleeve comprising an enlarged annular flange formed at one end thereof adjacent said lower spring cap, and an opposite end of said alignment sleeve residing in unattached relation to said upper spring cap.

2. A swivel wheel assembly according to claim 1, wherein said wheel axle comprises an axle bolt having an enlarged head and an external screw thread.

3. A swivel wheel assembly according to claim 2, and comprising an internally threaded fastener applied to the threaded end of said axle bolt to retain said axle bolt in position through the axle openings of said support arms.

4. A swivel wheel assembly according to claim 3, wherein said fastener comprises a castellated nut with slots adapted for receiving a safety pin extending through said axle bolt to further retain said axle bolt in position through the axle openings of said support arms.

5. A swivel wheel assembly according to claim 1, wherein said pivot pin comprises a pivot bolt having an enlarged head and an external screw thread.

6. A swivel wheel assembly according to claim 5, and comprising an internally threaded fastener for retaining said pivot bolt in position through the pin openings of said support arms.

7. A swivel wheel assembly according to claim 6, wherein said fastener comprises a castellated nut with slots adapted for receiving a safety pin extending through said pivot bolt to further retain said pivot bolt in position through the pin openings of said support arms.

* * * * *